US008139106B2

(12) United States Patent
Maiya

(10) Patent No.: US 8,139,106 B2
(45) Date of Patent: Mar. 20, 2012

(54) MICROSCOPE APPARATUS

(75) Inventor: Nobuhiko Maiya, Yokohama (JP)

(73) Assignee: Nikon Corporation, Tokyo (JP)

( * ) Notice: Subject to any disclaimer, the term of this patent is extended or adjusted under 35 U.S.C. 154(b) by 340 days.

(21) Appl. No.: 12/453,924

(22) Filed: May 27, 2009

(65) Prior Publication Data

US 2009/0237502 A1    Sep. 24, 2009

Related U.S. Application Data

(63) Continuation of application No. PCT/JP2007/001314, filed on Nov. 29, 2007.

(30) Foreign Application Priority Data

Nov. 30, 2006  (JP) .................................. 2006-324602

(51) Int. Cl.
 *H04N 7/18* (2006.01)
(52) U.S. Cl. ............ 348/79; 348/80; 348/372; 348/373; 250/234; 382/282; 382/190; 382/278; 382/133; 382/255; 396/432; 359/363; 359/368; 359/382; 359/391; 359/393
(58) Field of Classification Search .................... 348/79, 348/80, 372, 373
See application file for complete search history.

(56) References Cited

U.S. PATENT DOCUMENTS

| | | | |
|---|---|---|---|
| 4,354,114 A | 10/1982 | Karnaukhov et al. | |
| 6,313,452 B1 | 11/2001 | Paragano et al. | |
| 7,238,934 B2 * | 7/2007 | Motomura | 250/234 |
| 7,515,823 B2 * | 4/2009 | Sasaki et al. | 396/264 |
| 2003/0149983 A1 | 8/2003 | Markel | |
| 2005/0282268 A1 | 12/2005 | Kagayama | |
| 2006/0171023 A1 | 8/2006 | Kishida | |
| 2006/0204236 A1 | 9/2006 | Sasaki et al. | |

FOREIGN PATENT DOCUMENTS

| | | |
|---|---|---|
| GB | 2 343 807 A | 5/2000 |
| JP | A-2002-33997 | 1/2002 |
| JP | A-2004-309719 | 11/2004 |
| JP | A-2005-326495 | 11/2005 |
| JP | A-2006-215260 | 8/2006 |
| JP | A-2006-220904 | 8/2006 |

OTHER PUBLICATIONS

Nov. 14, 2011 Search Report issued in European Application No. 07828091.4.

* cited by examiner

*Primary Examiner* — Jude Jean Gilles
(74) *Attorney, Agent, or Firm* — Oliff & Berridge, PLC

(57) ABSTRACT

Provided with a time-lapse imaging unit which repeatedly captures a specimen at predetermined time intervals and generates a plurality of images, and a recording unit which records at least one of an image group including one or more of the images captured during a predetermined period among a period of a time-lapse capturing performed by the time-lapse imaging unit or an image group including one or more of the images picked at predetermined time intervals among the period of the time-lapse capturing performed by the time-lapse imaging unit. Thus, data generated in time-lapse photography are managed favorably in a microscope apparatus provided with a time-lapse imaging unit which repeatedly captures a specimen at predetermined time intervals and generates a plurality of images.

8 Claims, 6 Drawing Sheets

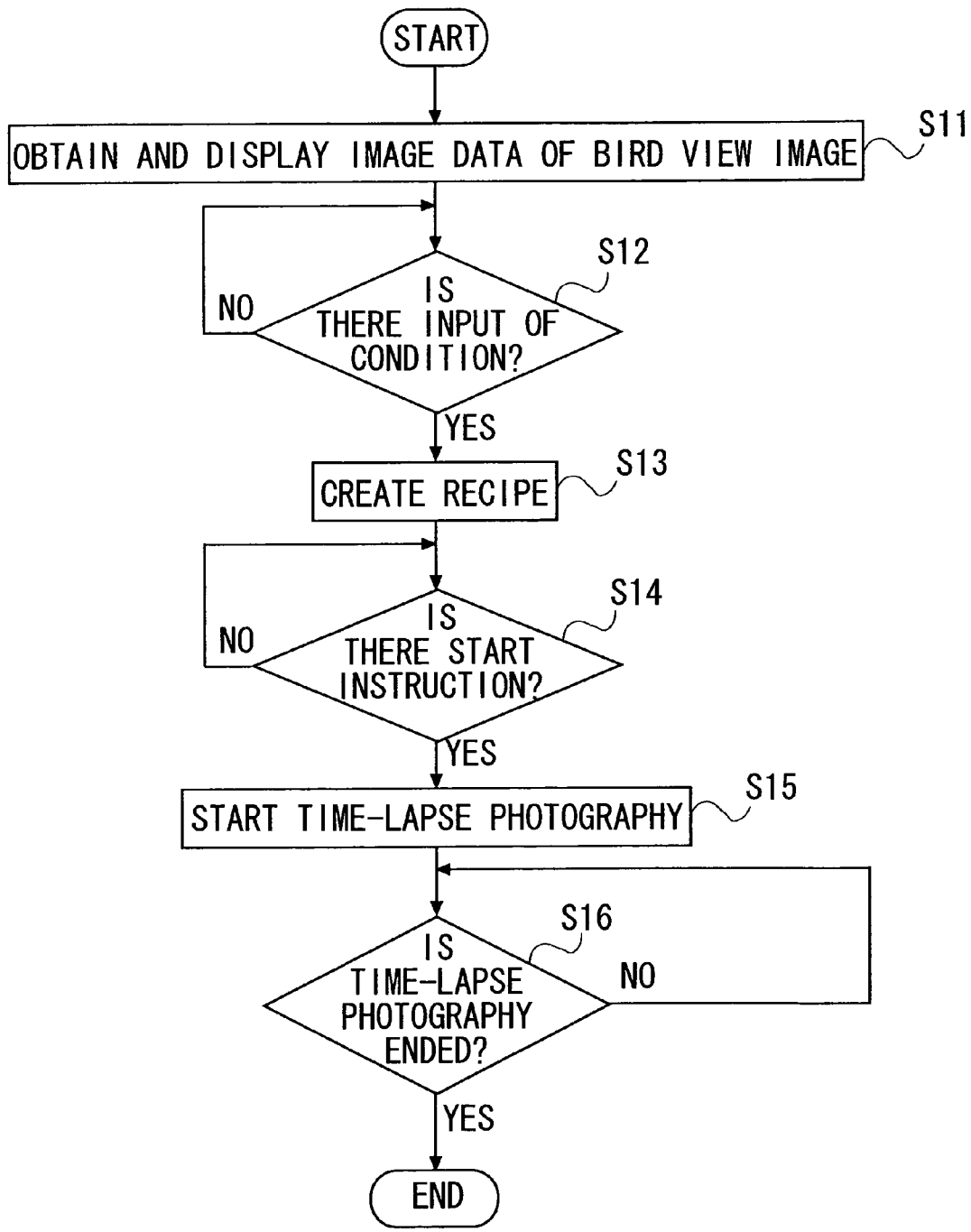

MICROSCOPE APPARATUS

CROSS REFERENCE TO THE RELATED APPLICATIONS

This application is a continuation application of International Application PCT/JP2007/001314, filed Nov. 29, 2007, designating the U.S., and claims the benefit of priority from Japanese Patent Application No. 2006-324602, filed on Nov. 30, 2006, the entire contents of which are incorporated herein by reference.

BACKGROUND

1. Field

The present application relates to a microscope apparatus including an imaging unit which captures an image of a specimen repeatedly and generates plurality of images.

2. Description of the Related Art

A microscope system which enlarges and photographs cultured cells being grown in a culture medium while controlling an environment such as a culture medium in a culture vessel are in practical use (see Patent Document 1: Japanese Unexamined Patent Application Publication No. 2005-326495, etc.). In this microscope system, time-lapse photography is effective for visually capturing gradual changes over time which occur in cultured cells (see Patent Document 2: Japanese Unexamined Patent Application Publication No. 2006-220904, etc.).

In the above-described microscope system, when the time-lapse photography is performed for a long period of time, an enormous amount of data (mainly image data) is generated. Accordingly, it is quite difficult to pull out, for example, target image data from the enormous amount of data.

A proposition of a microscope system according to the present application is to favorably manage data generated during time-lapse photography in a microscope apparatus including an imaging unit which captures an image of a specimen repeatedly and generates plurality of images.

SUMMARY

A microscope apparatus according to the present embodiments includes a time-lapse imaging unit which repeatedly captures a specimen at predetermined time intervals and generates a plurality of images, and a recording unit which records at least one of an image group including one or more of the images captured during a predetermined period among a period of a time-lapse capturing performed by the time-lapse imaging unit or an image group including one or more of the images picked at predetermined time intervals among the period of the time-lapse capturing performed by the time-lapse imaging unit.

Note that, preferably, the microscope apparatus may include a selecting unit which selects the images to be recorded from the plurality of images as the image group according to a state change of the specimen.

Further, preferably, the microscope apparatus may include an observation member for a fluorescence observation of the specimen, in which the selecting unit detects the state change of the specimen by obtaining an intensity ratio in fluorescence based on the images each generated by the time-lapse imaging unit when the fluorescence observation is performed by at least two types of different wavelengths.

Another microscope apparatus according to the present embodiments includes a time-lapse imaging unit which repeatedly captures a specimen at predetermined time intervals and generates a plurality of images, and a recording unit which clips an image of a predetermined area from each of the plurality of images generated by the time-lapse imaging unit, and records an image group including one or more images clipped.

Note that, preferably, the microscope apparatus may include an accepting unit which accepts a user instruction to specify an area of performing the clipping from at least two images of the plurality of images, in which the recording unit determines the area of performing the clipping for each of the plurality of images based on the user instruction.

Further, preferably, the microscope apparatus may include a selecting unit which selects the area of performing the clipping for each of the plurality of images according to a state change of the specimen.

Further, preferably, the microscope apparatus may include an observation member for a fluorescence observation of the specimen, in which the selecting unit detects the state change of the specimen by obtaining an intensity ratio in fluorescence based on the images each generated by the time-lapse imaging unit when the fluorescence observation is performed by at least two types of different wavelengths.

Another microscope apparatus according to the present embodiments includes a time-lapse imaging unit which repeatedly captures a specimen at predetermined time intervals and generates a plurality of images, and a recording unit which generates either a first image group including one or more of the images captured during a predetermined period among a period of a time-lapse capturing performed by the time-lapse imaging unit or a second image group including one or more of the images picked at predetermined time intervals among the period of the time-lapse capturing performed by the time-lapse imaging unit, and further clips an image of a predetermined area from each of the plurality of images forming the generated image groups and records a third image group including one or more images clipped.

With a microscope system according to the present application, data generated during time-lapse photography can be managed favorably in a microscope apparatus including an imaging unit which captures an image of a specimen repeatedly and generates plurality of images.

BRIEF DESCRIPTION OF THE DRAWINGS

FIG. 2 is an operation flowchart of a computer 170.

DETAILED DESCRIPTION OF THE EMBODIMENTS

Hereinafter, an embodiment of the present application will be explained using drawings.

Figure 1:
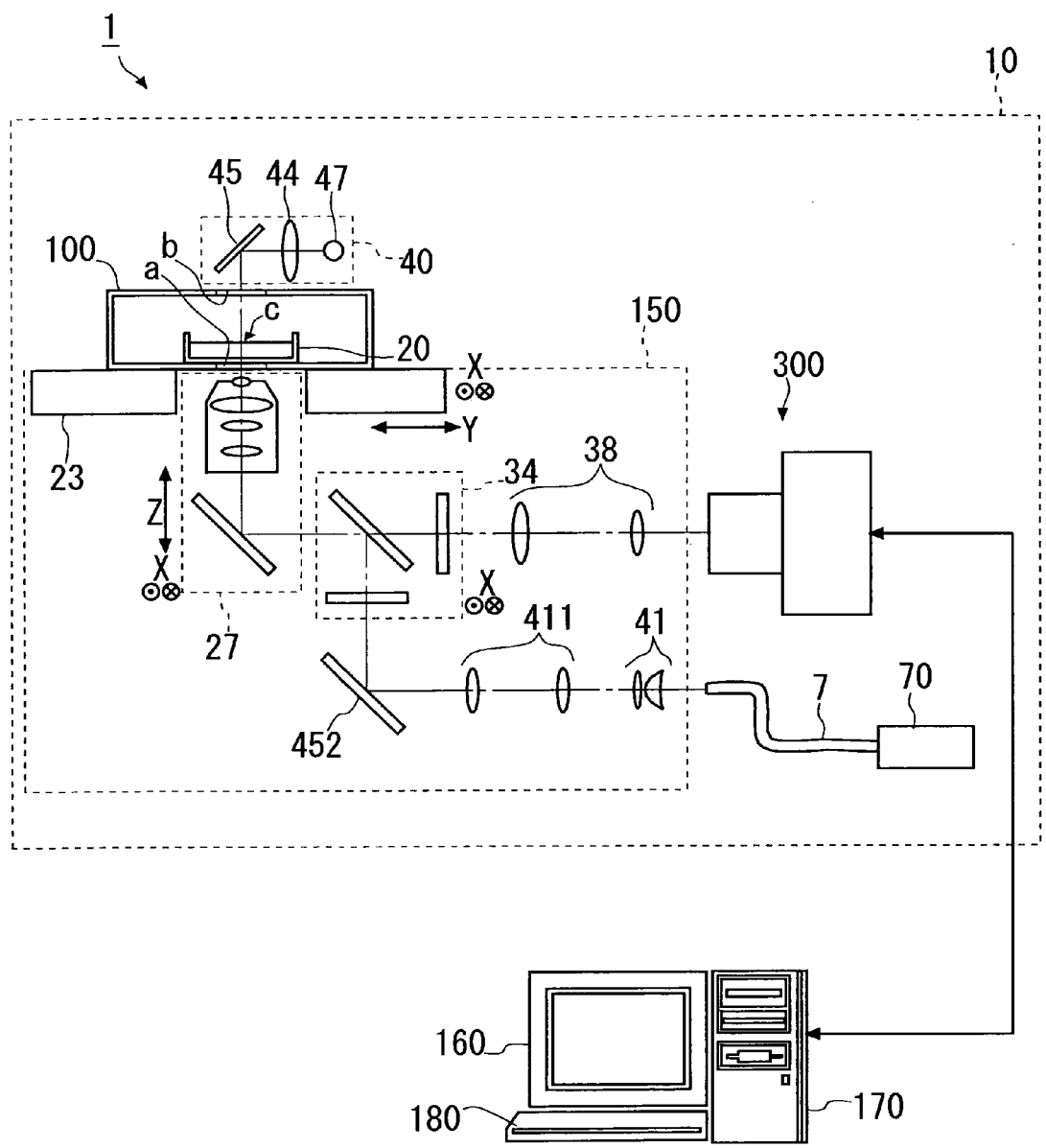
FIG. 1 is a structural diagram of a microscope apparatus 1.

FIG. 1 is a structural diagram of a microscope apparatus 1 of this embodiment. As shown in FIG. 1, the microscope apparatus 1 is provided with an apparatus body 10, a computer 170, a monitor 160, and an input device 180. The apparatus body 10 is provided with a microscope part 150, a transmission lighting part 40, a cold camera 300, an excitation light source 70, and an optical fiber 7.

The microscope part 150 is provided with a stage 23, an objective lens part 27, a fluorescence filter part 34, an imaging lens part 38, a deflecting mirror 452, a field lens 411, and a collector lens 41. The transmission lighting part 40 is provided with a transmission light source 47, a field lens 44, and a deflecting mirror 45.

A chamber 100 accommodating a transparent culture vessel 20 is mounted on the stage 23. The culture vessel 20 is filled with a culture medium, and cultured cells marked by a fluorescent material are grown in this culture medium. For observing the cultured cells from the outside of the chamber 100, a part a of a bottom face of the chamber 100 and a part b of an upper part of the chamber 100 are made transparent. Here, for brevity, the culture vessel 20 with an open upper face will be explained, but the upper face of the culture vessel 20 is covered as necessary with a lid made of the same material as the culture vessel 20.

In the objective lens part 27, plural types of objective lenses are fitted along an X-direction of FIG. 1. When the objective lens part 27 is driven in the X-direction by a not-shown mechanism, the type of the objective lens disposed in an optical path of the apparatus body 10 is switched. This switching is performed under control by the computer 170.

In the fluorescence filter part 34, plural types of filter blocks are fitted along the X-direction of FIG. 1. When the fluorescence filter part 34 is driven in the X-direction by a not-shown mechanism, the type of the filter block disposed in the optical path of the apparatus body 10 is switched. This switching is also performed under control by the computer 170.

The computer 170 switches a combination of the type of the objective lens disposed in the optical path and the type of the filter block disposed in the optical path according to an observation method to be set in the apparatus body 10. Hereinafter, it is considered that this switching causes the observation method of the apparatus body 10 to switch between phase difference observation and two types of fluorescence observation.

Between the phase difference observation and the fluorescence observation among them, both the type of the filter block disposed in the optical path and the type of the objective lens disposed in the optical path are different. Between the two types of fluorescence observation, only the type of the filter block disposed in the optical path is different. Further, also an illumination method is different between the phase difference observation and the fluorescence observation.

The computer 170 turns on the transmission light source 47 for activating an optical path of the transmission lighting part 40 when performing the phase difference observation, and turns on the excitation light source 70 for activating an optical path of an epi-illumination unit (optical path passing through the excitation light source 70, the optical fiber 7, the collector lens 41, the field lens 411, the deflecting mirror 452, the fluorescence filter part 34, and the objective lens part 27 in this order) when performing the fluorescence observation. In addition, when the transmission light source 47 is turned on, the excitation light source 70 is turned off, and when the excitation light source 70 is turned on, the transmission light source 47 is turned off.

When performing the phase difference observation, a light emitted from the transmission light source 47 illuminates an observation point c in the culture vessel 20 via the field lens 44, the deflecting mirror 45, and the transparent part b of the chamber 100. The light passed through the observation point c reaches a light receiving surface of the cold camera 300 via a bottom face of the culture vessel 20, the transparent part a of the chamber 100, the objective lens part 27, the fluorescence filter part 34, and the imaging lens 38, thereby forming a phase-contrast image of the observation point c. When the cold camera 300 is driven in this state, the phase-contrast image is captured and image data is generated. This image data (image data of the phase-contrast image) is taken into the computer 170.

When performing the fluorescence observation, a light emitted from the excitation light source 70 illuminates the observation point c in the culture vessel 20 via the optical fiber 7, the collector lens 41, the field lens 411, the deflecting mirror 452, the fluorescence filter part 34, the objective lens part 27, the transparent part a of the chamber 100, and the bottom face of the culture vessel 20. Thus, a fluorescent material existing at the observation point c is excited and emits fluorescence. This fluorescence reaches the light receiving surface of the cold camera 300 via the bottom face of the culture vessel 20, the transmission part a of the chamber 100, the objective lens part 27, the fluorescence filter part 34, and the imaging lens 38, thereby forming a fluorescence image of the observation point c. When the cold camera 300 is driven in this state, the fluorescence image is captured and image data is generated. This image data (image data of the fluorescence image) is taken into the computer 170.

In addition, the computer 170 controls X, Y, Z coordinates of the observation point c in the culture vessel 20 by controlling X, Y coordinates of the stage 23 and a Z coordinate of the objective lens part 27.

Further, a not-shown humidifier is coupled to the chamber 100 via a not-shown silicone tube, and humidity and $CO_2$ concentration in the chamber 100 are both controlled to be close to predetermined values. Further, an ambient atmosphere of the chamber 100 is circulated appropriately by a not-shown heat exchanger, and thereby the internal temperature of the chamber 100 is controlled to be close to a predetermined value. The humidity, $CO_2$ concentration, and temperature in the chamber 100 are measured by not-shown sensors. Then the measurement results are taken into the computer 170. On the other hand, the cold camera 300 is housed in a cabinet separated from the other parts of the apparatus body 10, and is kept at approximately the same temperature as the air temperature outside the apparatus body 10, irrespective of the internal temperature of the chamber 100.

Next, operation of the computer 170 related to time-lapse photography will be explained.

It is assumed that a program for observation is installed in the computer 170, and the computer 170 operates according to this program. It is also assumed that any input of information to the computer 170 by the user is performed via the input device 180.

FIG. 2 is an operation flowchart of the computer 170. As shown in FIG. 2, the computer 170 first sets the observation method of the apparatus body 10 to the phase difference observation (more precisely, the phase difference observation at a low magnification), obtains image data of a bird view image in this state, and displays it on the monitor 160 (step S11). The bird view image refers to an image of a relatively wide area in the culture vessel 20.

When obtaining the image data of the bird view image, the computer 170 repeatedly obtains image data of a phase difference image while moving the observation point c in the culture vessel 20 in the x, y directions, and combines obtained plurality of image data into image data of one image. Individual Image data are image data of what are called tile images, and image data after being combined is image data of the bird view image.

While observing the bird view image displayed on the monitor 160, the user determines conditions (interval, round number, observation point, observation method, and the like) of the time-lapse photography.

When conditions are input by the user (steps S11, YES), the computer 170 creates a recipe in which the conditions are written (step S13). The destination of storing the recipe is, for example, a hard disk in the computer 170. Hereinafter, the interval, round number, observation point, and observation method written in the recipe are called "specified interval", "specified round number", "specified point", and "specified observation method", respectively.

Thereafter, when a start instruction for the time-lapse photography is input by the user (step S14), the computer 170 starts the time-lapse photography (step S15).

In the time-lapse photography, the computer 170 matches the observation point c of the culture vessel 20 with the specified point, and sets the observation method of the apparatus body 10 to the specified observation method and obtains image data in this state. When there are three types of specified observation methods, three types of image data are obtained sequentially while switching the observation method of the apparatus body 10 among the three types of specified observation methods. Thus, a first round of photography finishes.

Thereafter, the computer 170 allows a standby time by the specified interval to elapse from the time of starting the first round of photography, and then starts a second round of photography. The method of the second round of photography is the same as that of the first round.

Furthermore, the photography thereafter is repeated until the number of the already performed photography reaches the specified round number (until YES in step S16 becomes true).

Now, in the period of time-lapse photography (period in which NO in step S16 becomes true), the computer 170 sequentially stores image data taken in from the apparatus body 10 in an implementation progress file. The destination of storing this implementation progress file is, for example, the hard disk in the computer 170.

Furthermore, when a check instruction is input by the user during the period of time-lapse photography or after the time-lapse photography is finished, the computer 170 refers to the contents of the implementation progress file at this moment, and displays an operation progress check screen, which will be explained below, on the monitor 160 based on the contents.

Figure 3A:
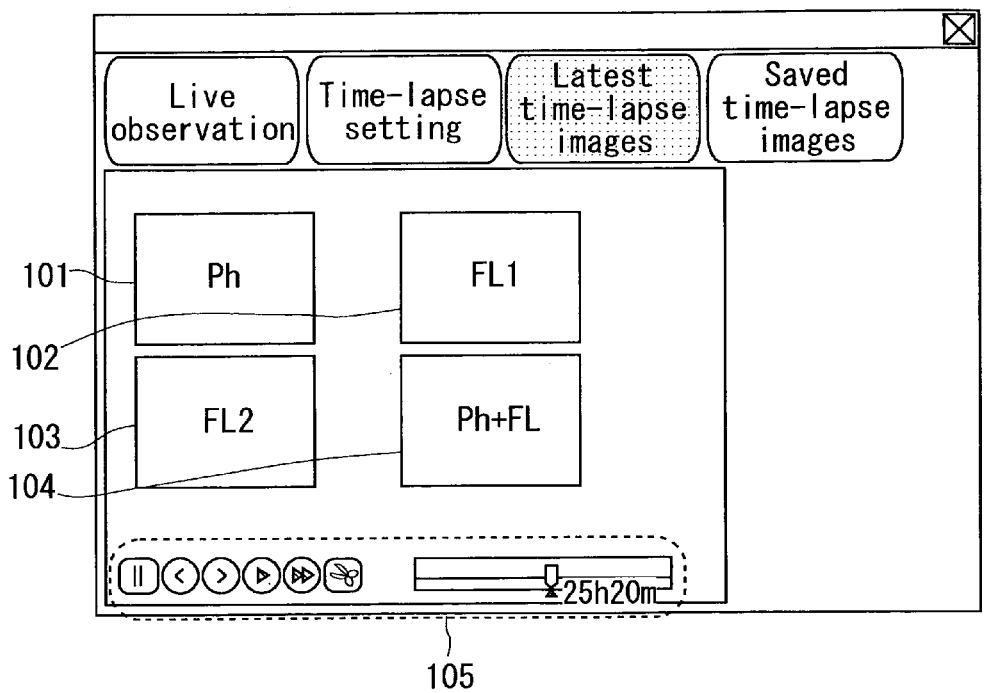
FIGS. 3A and 3B are diagrams showing an operation progress check screen.
Figure 3B:
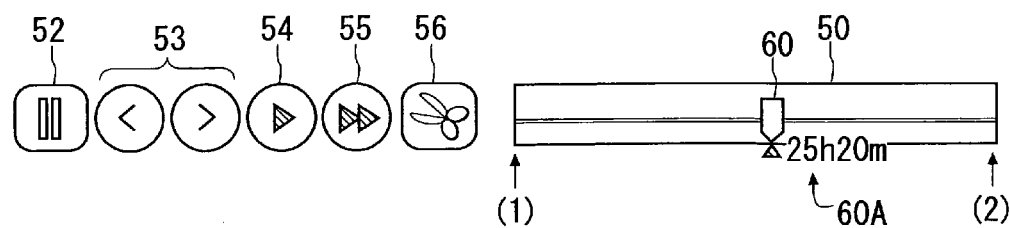

FIG. 3A and FIG. 3B are views showing the operation progress check screen. As shown in FIG. 3A, in the operation progress check screen, display areas 101, 102, 103, 104 and a reproduction control part 105 are disposed.

The display area 101 is an area where a moving image of a phase difference image is to be displayed. The display area 102 is an area where a moving image of one (first fluorescence image) of two types of fluorescence images is to be displayed. The display area 103 is an area where a moving image of the other (second fluorescence image) of the two types of fluorescence images is to be displayed. Further, the display area 104 is an area where a moving image of a combined image of the phase difference image and the fluorescence images is to be displayed.

Prior to displaying of the moving images, the computer 170 reads the three types of image data obtained in each round from the implementation progress file. The computer 170 then creates a moving image file of the phase difference image by coupling frames of image data of the phase difference image among the read data in time-series order, creates a moving image file of the first fluorescence image by coupling frames of image data of the first fluorescence image in time-series order, and creates a moving image file of the second fluorescence image by coupling frames of image data of the second fluorescence image in time-series order. Further, the computer 170 combines the image data of the phase difference image and the image data of the fluorescence images frame by frame, and couples frames after being combined in time-series order to thereby create a moving image file of the combined images. The destination of storing these four types of moving image files is, for example, the hard disk in the computer 170.

When displaying the moving images, the computer 170 reads the created four types of moving image files in a simultaneous and parallel manner, generates moving image signals for individually displaying the four types of moving images in the four display areas 101, 102, 103, 104, and transmits the signals to the monitor 160 in the order of generation. Hereinafter, this series of processing by the computer 170 including reading moving image files, generating moving image signals, and transmitting the moving image signals is called "reproduction of moving image files".

The reproduction control part 105 shown in FIG. 3A is a GUI image for the user to input an instruction related to reproduction of moving image files to the computer.

FIG. 3B is an enlarged view of the reproduction control part 105. As shown in FIG. 3B, on the reproduction control part 105, there are disposed a stop button 52, a skip button 53, a play button 54, a fast forward button 55, a clipping button 56 (details of which will be described later), a time line 50, and so on.

When the user selects the play button 54, reproduction of moving image files is started, and display of moving images in the display areas 101, 102, 103, and 104 is started. Further, when the user selects the stop button 52, the moving images displayed in the display areas 101, 102, 103, and 104 are stopped.

The reproducing point in the moving image files is reflected on the time line 50. A left end (1) of the time line 50 indicates the beginning of the moving image files (start time of the time-lapse photography), and a right end (2) of the time line 50 indicates the end of the moving image files (end time of the time-lapse photography). In addition, when the time-lapse photography is not ended, the right end (2) of the time line 50 indicates the current time. A slider bar 60 is disposed on this time line 50, and the reproducing point in the moving image file is represented in real time by the position of the slider bar 60 in a left and right direction.

The position of this slider bar 60 in the left and right direction can be changed freely by the user. When the position of the slider bar 60 in the left and right direction is changed, the reproducing point in the moving image file is changed accordingly.

Incidentally, when the time-lapse photography described above is performed for a long period of time, an enormous amount of moving image files is generated. Accordingly, in this embodiment, a different moving image file including target image data is created using two methods, time clipping and space clipping.

(1) Time Clipping

Time clipping includes two types of methods. The first method is to create a moving image file including plurality of images generated in a predetermined period during the period of time-lapse photography. Further, the second method is to create a moving image file including plurality of images which are picked at every predetermined time interval from plurality of images generated during the period of time-lapse photography.

Figure 4A:
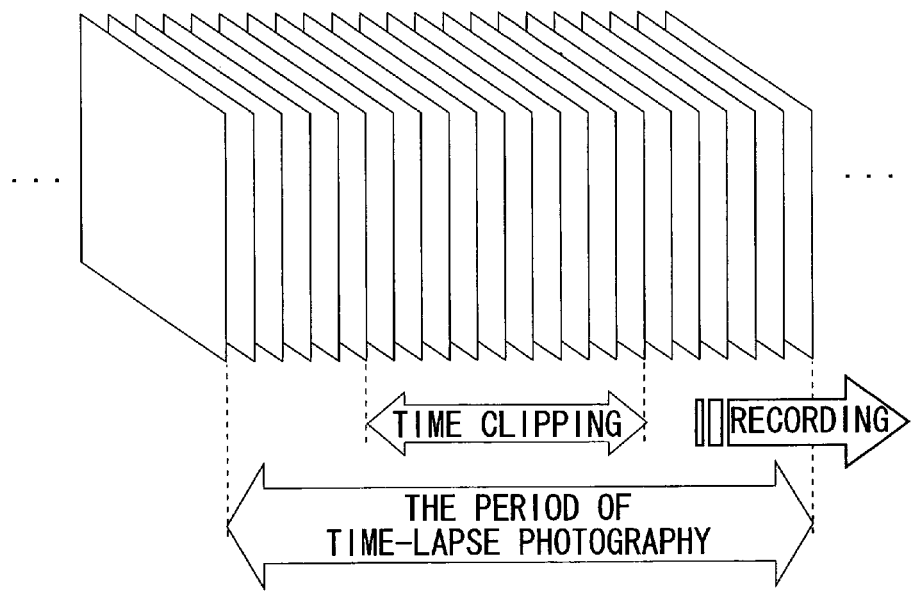
FIGS. 4A and 4B are diagrams explaining time clipping.
Figure 4B:
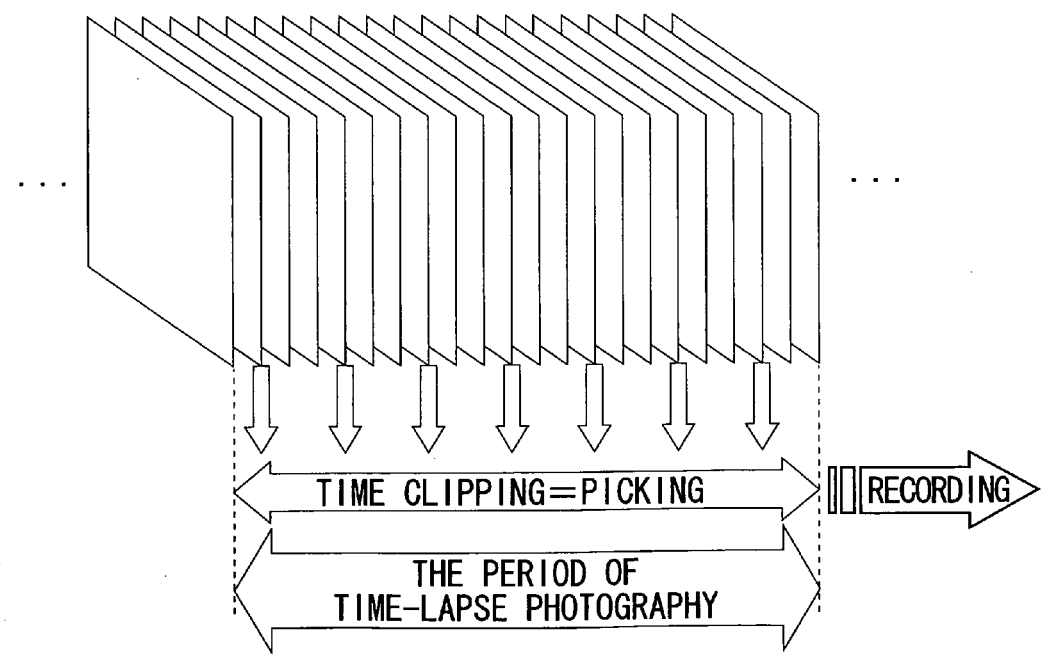

These methods will be explained in detail using FIGS. 4A and 4B. FIG. 4A is a diagram explaining the first method, and FIG. 4B is a diagram explaining the second method. In the first method, as shown in FIG. 4A, plurality of images generated during a predetermined period, which is specified by a method that will be described later, are pulled out from plurality of images generated during the period of time-lapse photography, and a moving image file including the pulled out plurality of images is created. Further, in the second method, as shown in FIG. 4B, there is created a moving image file including plurality of images which are picked at every predetermined time interval, which is specified by a method that will be described later, from plurality of images generated during the period of time-lapse photography.

There are following two methods for specifying the period in which time clipping is performed and the picking interval.

(1)-[1] Manual Method

Figure 5A:
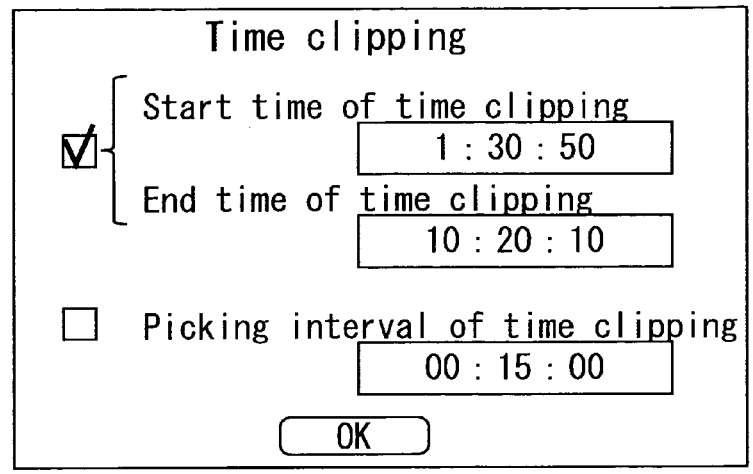
FIGS. 5A to 5C are other diagrams explaining the time clipping.

When the user selects the clipping button 56, the computer 170 displays a clipping specification screen shown in FIG. 5A on the monitor 160. The user can input the period in which time clipping is performed and the picking interval via the input device 180 so as to specify them. Note that the picking interval may not necessarily be even. For example, the picking interval may be specified such as every 10 minutes in a first hour, every 20 minutes in a next hour, every 10 minutes in a next hour thereafter, and so on.

Figure 5B:
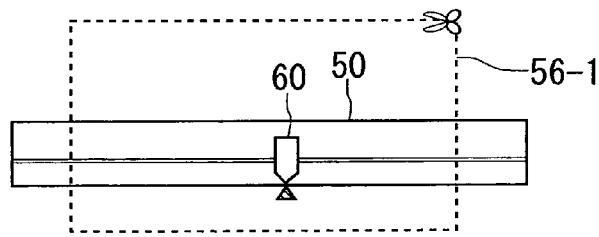

Further, when the user selects the clipping button 56, a clipping frame 56-1 is displayed on the time line 50 as shown in FIG. 5B, by which the user may specify an arbitrary period on the time line 50 via the input device 180 as a period to perform time clipping.

Figure 5C:
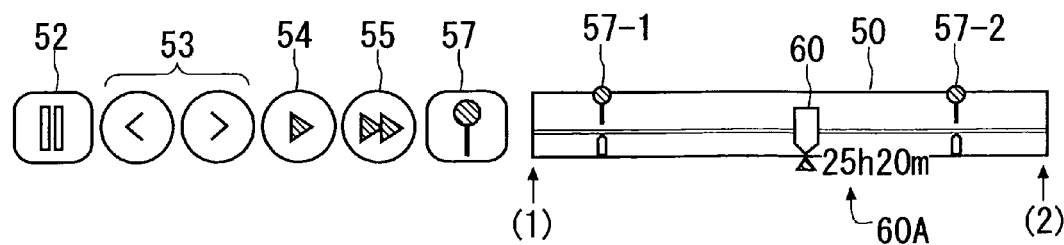

Furthermore, as shown in FIG. 5C, a marking button 57 may be provided instead of the clipping button 56 on the reproduction control part 105. Then the user may specify a desired time by selecting the marking button 57 via the input device 180 during the period of time-lapse photography and after the time-lapse photography is finished. In this case, as shown in FIG. 5C, marks (57-1, 57-2) may be displayed on the time line 50.

Time clipping is then performed according to the marks. For example, another moving image file may be created by pulling out only marked images, or another moving image file may be created by pulling out a few or few tens of images around marked images.

In either case, the user can mark a target image via the input device 180 to thereby perform time clipping around this image.

(1)-[2] Automatic Method

Time clipping may be performed automatically according to a state change while monitoring a state of a specimen by the computer 170. Specifically, the state of the specimen is monitored based on images generated in the period of time-lapse photography, and processing similar to that by the marking button 57 explained in (1)-[1] may be performed based on a monitoring result. For example, an intensity ratio in fluorescence of the above-described first fluorescence image and second fluorescence image can be obtained, and a state change of the specimen can be monitored based on this intensity ratio in fluorescence.

(2) Space Clipping

Space clipping is a method to clip an image of a predetermined area from each of plurality of images generated in a predetermined period in the period of time-lapse photography, and generate a moving image file including clipped plurality of images.

There are following two methods for specifying the clipping area in space clipping.

(2)-[1] Manual Method

Figure 6A:
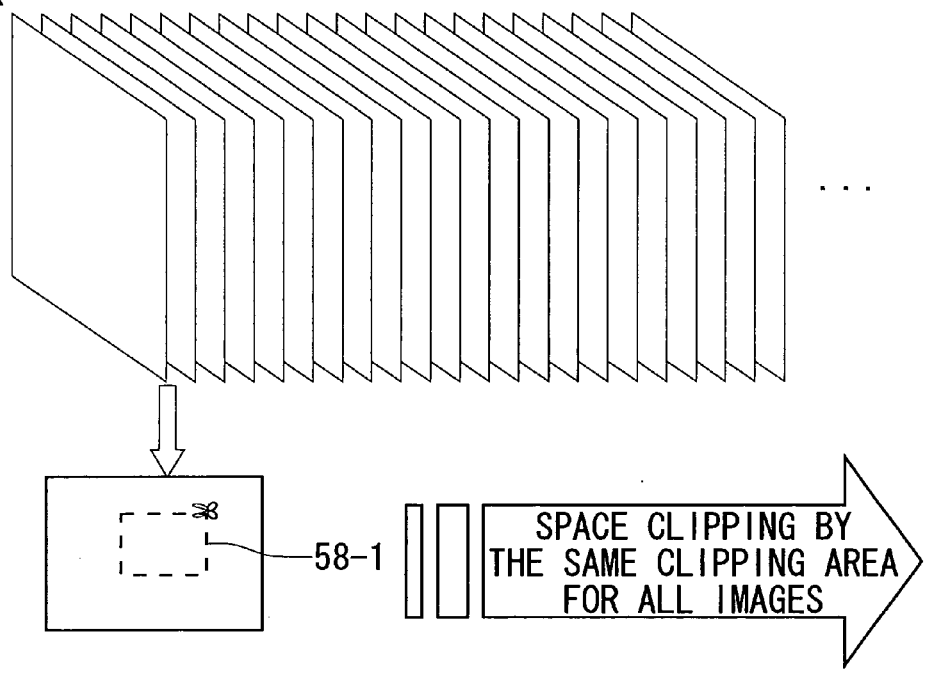
FIGS. 6A and 6B are diagrams explaining space clipping.

When the user selects the clipping button 56 (see FIG. 3B), the computer 170 displays a clipping frame 58-1 on a display area as shown in FIG. 6A. Then the user specifies a clipping area on the display area via the input device 180 in one image (first image in the example of FIG. 6A) among plurality of images generated in the period of time-lapse photography. Then, space clipping is performed by the same clipping area for all the images.

Figure 6B:
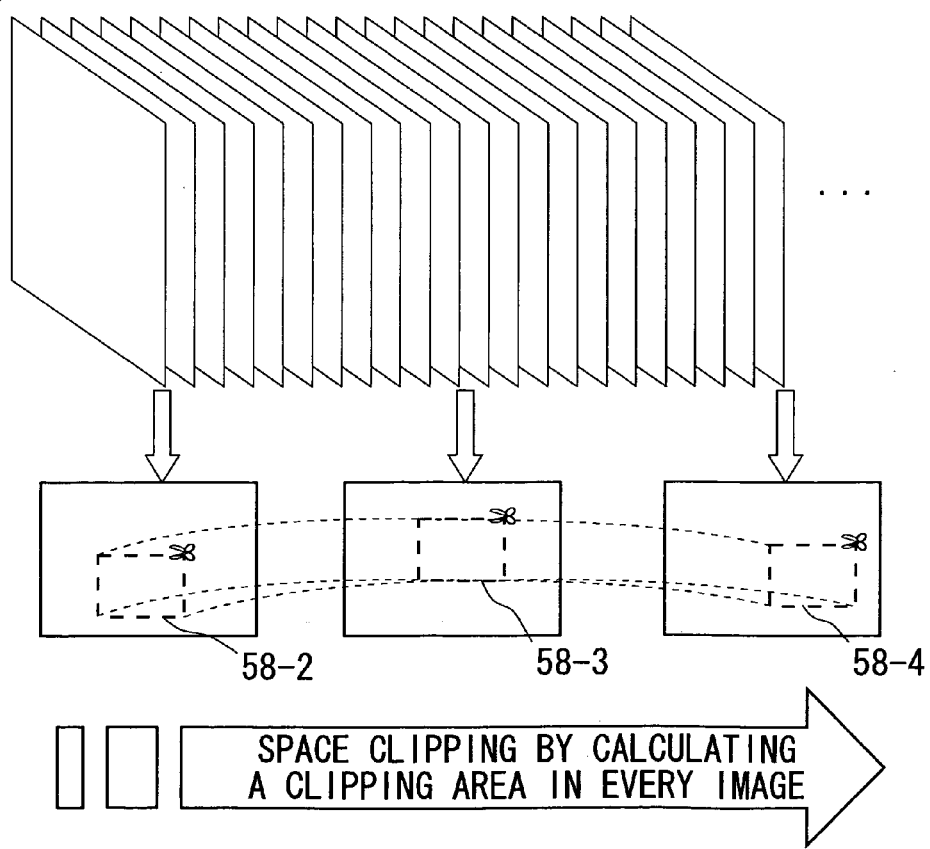

Further, as shown in FIG. 6B, the user may specify clipping areas (58-2, 58-3, and 58-4) on display areas via the input device 180 in plurality of images (the first image, a middle image, and the last image in the example of FIG. 6B). In this case, space clipping is performed by calculating a clipping area in every image by an interpolation method or the like.

In either case, the user can specify a target area as a clipping area via the input device 180 to thereby perform space clipping around this area.

(2)-[2] Automatic Method

Space clipping may be performed automatically according to a state change while monitoring a state of a specimen by the computer 170. Specifically, the user specifies a clipping area via the input device 180 at the time of starting the time-lapse photography. Then fluorescence intensity distributions of a first fluorescence image and a second fluorescence image generated during the time-lapse photography period thereafter are obtained, and the clipping area specified by the user can be traced based on the fluorescence intensity distributions. In addition, the user may specify a clipping area via the input device 180 in middle of the time-lapse photography, and thereafter the clipping area may be traced based on an image generated during the time-lapse photography period.

(3) Application Examples

The time clipping explained in (1) and the space clipping explained in (2) may be performed in combination. Note that the space clipping may be performed after the time clipping is performed, or the time clipping may be performed after the space clipping is performed. Further, the time clipping and the space clipping may be performed at the same time. Particularly, when the space clipping is performed after the time clipping is performed, processing by the computer 170 can be made lighter.

As has been explained above, according to this embodiment, in the microscope apparatus including a time-lapse imaging unit which captures a specimen repeatedly at predetermined time intervals and generates plurality of images, pulling out target data can be facilitated by performing at least one of the time clipping and the space clipping on generated data. Thus, data generated during time-lapse photography can be managed preferably.

Note that in this embodiment, a moving image file generated by performing at least one of the time clipping and the space clipping may be recorded by associating with a moving image file including all the images generated in the period of time-lapse photography. Further, after checking the user's demand, the moving image file generated by performing at least one of the time clipping and the space clipping may be recorded instead of the moving image file including all the images generated in the period of time-lapse photography.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A microscope apparatus, comprising:
a time-lapse imaging unit which repeatedly captures a specimen at predetermined time intervals and generates a plurality of images; and
a recording unit which records at least one of an image group including one or more of the images captured during a predetermined period among a period of a time-lapse capturing performed by the time-lapse imaging unit and an image group including one or more of the images picked at predetermined time intervals among the period of the time-lapse capturing performed by the time-lapse imaging unit.

2. The microscope apparatus according to claim 1, further comprising
a selecting unit which selects the images to be recorded from the plurality of images as the image group according to a state change of the specimen.

3. The microscope apparatus according to claim 2, further comprising
an observation member for a fluorescence observation of the specimen, wherein
the selecting unit detects the state change of the specimen by obtaining an intensity ratio in fluorescence based on the images each generated by the time-lapse imaging unit when the fluorescence observation is performed by at least two types of different wavelengths.

4. A microscope apparatus, comprising:
a time-lapse imaging unit which repeatedly captures a specimen at predetermined time intervals and generates a plurality of images; and
a recording unit which clips an image of a predetermined area from each of the plurality of images generated by the time-lapse imaging unit, and records an image group including one or more images clipped.

5. The microscope apparatus according to claim 4, further comprising
an accepting unit which accepts a user instruction to specify an area of performing the clipping from at least two images of the plurality of images, wherein
the recording unit determines the area of performing the clipping for each of the plurality of images based on the user instruction.

6. The microscope apparatus according to claim 4, further comprising
a selecting unit which selects the area of performing the clipping for each of the plurality of images according to a state change of the specimen.

7. The microscope apparatus according to claim 6, further comprising
an observation member for a fluorescence observation of the specimen, wherein
the selecting unit detects the state change of the specimen by obtaining an intensity ratio in fluorescence based on the images each generated by the time-lapse imaging unit when the fluorescence observation is performed by at least two types of different wavelengths.

8. A microscope apparatus, comprising:
a time-lapse imaging unit which repeatedly captures a specimen at predetermined time intervals and generates a plurality of images; and
a recording unit which generates either one of a first image group including one or more of the images captured during a predetermined period among a period of a time-lapse capturing performed by the time-lapse imaging unit and a second image group including one or more of the images picked at predetermined time intervals among the period of the time-lapse capturing performed by the time-lapse imaging unit, and further clips an image of a predetermined area from each of the plurality of images forming the generated image groups and records a third image group including one or more images clipped.

* * * * *